(12) United States Patent
Minagata et al.

(10) Patent No.: US 10,340,501 B2
(45) Date of Patent: Jul. 2, 2019

(54) ELECTRICAL ENERGY STORAGE DEVICE

(71) Applicants: KABUSHIKI KAISHA TOYOTA JIDOSHOKKI, Aichi (JP); Eagle Industry Co., Ltd., Minato-ku, Tokyo (JP)

(72) Inventors: Atsushi Minagata, Kariya (JP); Motoaki Okuda, Kariya (JP); Toshiaki Iwa, Tokyo (JP); Yoshihiro Ogawa, Tokyo (JP); Makoto Mitsuyasu, Tokyo (JP); Norimitsu Akiyoshi, Tokyo (JP)

(73) Assignees: KABUSHIKI KAISHA TOYOTA JIDOSHOKKI, Aichi (JP); Eagle Industry Co., Ltd., Minato-ku, Tokyo (JP)

( * ) Notice: Subject to any disclaimer, the term of this patent is extended or adjusted under 35 U.S.C. 154(b) by 227 days.

(21) Appl. No.: 15/305,545

(22) PCT Filed: Feb. 27, 2015

(86) PCT No.: PCT/JP2015/055967
§ 371 (c)(1),
(2) Date: Oct. 20, 2016

(87) PCT Pub. No.: WO2015/163005
PCT Pub. Date: Oct. 29, 2015

(65) Prior Publication Data
US 2017/0047578 A1   Feb. 16, 2017

(30) Foreign Application Priority Data

Apr. 23, 2014 (JP) ................. 2014-089292

(51) Int. Cl.
*H01M 2/34* (2006.01)
*H01G 9/12* (2006.01)
(Continued)

(52) U.S. Cl.
CPC .............. *H01M 2/345* (2013.01); *H01G 9/10* (2013.01); *H01G 9/12* (2013.01); *H01G 11/14* (2013.01);
(Continued)

(58) Field of Classification Search
CPC .......... H01M 2/345; H01M 2/08; H01G 9/12; H01G 11/14; H01G 11/74; H01G 11/80
(Continued)

(56) References Cited

U.S. PATENT DOCUMENTS

2015/0079432 A1   3/2015   Okuda et al.

FOREIGN PATENT DOCUMENTS

JP         2004-95565 A      3/2004
JP    WO 2013154166 A1  *  10/2013  ............ H01M 2/345
(Continued)

OTHER PUBLICATIONS

English translation of Iwo, WO 2013154166 A1, Oct. 2013, Japan.*
(Continued)

*Primary Examiner* — Cynthia H Kelly
*Assistant Examiner* — Rashid A Alam
(74) *Attorney, Agent, or Firm* — Sughrue Mion, PLLC (57) ABSTRACT

A current interruption device includes a first conductive member, a second conductive member, a first deformable member, a second deformable member, and a first seal member. The second conductive member is disposed at a position opposed to the first conductive member. A center portion of the first deformable member is fixed to the second conductive member. The second deformable member is disposed on a side opposite to the first deformable member relative to the second conductive member. The first seal member is disposed between the first conductive member and the second conductive member. A second seal member is disposed between the first conductive member and the
(Continued)

casing. A gas permeability between the casing and the first conductive member is equal to or less than a gas permeability between the first conductive member and the second conductive member.

8 Claims, 2 Drawing Sheets

(51) Int. Cl.
    *H01G 11/14*     (2013.01)
    *H01G 11/74*     (2013.01)
    *H01G 11/80*     (2013.01)
    *H01M 2/08*     (2006.01)
    *H01G 9/10*     (2006.01)

(52) U.S. Cl.
    CPC ............. *H01G 11/74* (2013.01); *H01G 11/80* (2013.01); *H01M 2/08* (2013.01); *H01M 2200/20* (2013.01)

(58) Field of Classification Search
    USPC .......................................................... 429/61
    See application file for complete search history.

(56) References Cited

FOREIGN PATENT DOCUMENTS

| | | |
|---|---|---|
| JP | 2014-17051 A | 1/2014 |
| WO | 2013/154166 A1 | 10/2013 |

OTHER PUBLICATIONS

International Search Report of PCT/JP2015/055967 dated May 19, 2015.
International Preliminary Report on Patentability with translation of Written Opinion dated Oct. 25, 2016, issued by the International Searching Authority in application No. PCT/JP2015/055967.

* cited by examiner

ELECTRICAL ENERGY STORAGE DEVICE

CROSS REFERENCE TO RELATED APPLICATIONS

This application is a National Stage of International Application No. PCT/JP2015/055967 filed Feb. 27, 2015, claiming priority based on Japanese Patent Application No. 2014-089292 filed Apr. 23, 2014, the contents of all of which are incorporated herein by reference in their entirety.

TECHNICAL FIELD

This application claims priority to Japanese Patent Application No. 2014-089292 filed on Apr. 23, 2014, the entire contents of which are hereby incorporated by reference into the present application. The art disclosed herein relates to an electrical energy storage device comprising a current interruption device.

BACKGROUND ART

There have been developed current interruption devices configured to interrupt current to flow between electrode terminals (positive terminal and negative terminal) in case where an electrical energy storage device is overcharged or short-circuiting occurs in the electrical energy storage device. The current interruption device is disposed between the electrode terminal and a corresponding electrode (between positive terminal and positive electrode, or between negative terminal and negative electrode). The current interruption device is configured to interrupt conduction between the electrode terminal and the electrode when pressure in a casing of the electrical energy storage device increases. International Publication No. WO 2013/154166 A1 discloses a current interruption device including a first conductive member connected to the electrode terminal, and a second conductive member connected to the electrode. Hereinafter, International Publication No. WO 2013/154166 A1 is referred to as Patent Literature 1. The first conductive member and the second conductive member are disposed to be spaced from each other. A first deformable member is disposed between the first conductive member and the second conductive member. An end of the first deformable member is connected to the first conductive member, and a center of the first deformable member is connected to the second conductive member. In addition, a second deformable member is disposed on a side opposite to the first deformable member relative to the second conductive member. The second deformable member is provided with a projection. Further, in Patent Literature 1, a first seal member is disposed between the first conductive member and the second conductive member such that an inside of the current interruption device is kept airtight against an outside of the current interruption device. Still further, a second seal member is disposed between the first conductive member and the casing such that an inside of the casing is kept airtight against an outside of the casing.

SUMMARY OF INVENTION

In the electrical energy storage device of Patent Literature 1, when the pressure in the casing exceeds a predetermined value, the second deformable member is moved to a first conductive member side, and the second conductive member is broken off by the projection. The first deformable member is disconnected from the second conductive member to interrupt the conduction between the electrode terminal and the electrode. The second deformable member is designed to move to the first conductive member side when a pressure difference between the inside and the outside of the current interruption device exceeds a predetermined value. However, when the pressure in the casing does not properly increase in case where an abnormality occurs in the electrical energy storage device, there may be a case where the second deformable member is not moved to the second conductive member side, and therefore the conduction between the electrode terminal and the electrode is not interrupted. That is, responsiveness of the current interruption device is decreased. According to the art disclosed herein, the decrease in responsiveness of a current interruption device is restrained.

The electrical energy storage device disclosed herein comprises a current interruption device configured to interrupt conduction between an electrode terminal and an electrode when pressure in a casing exceeds a predetermined value. Note that, the electrode is accommodated in the casing. Further, the electrode terminal is fixed to the casing and configured to transfer electricity with the electrode. The current interruption device comprises a first conductive member, a second conductive member, a first deformable member, a second deformable member, and a first seal member. The first conductive member is fixed to the casing and connected to the electrode terminal. The second conductive member is disposed at a position spaced from and opposed to the first conductive member. The second conductive member is connected to the electrode. The first deformable member is disposed between the first conductive member and the second conductive member. An end of the first deformable member is connected to the first conductive member, and a center portion of the first deformable member is connected to the second conductive member. The first deformable member is configured to be brought out of conduction with the second conductive member when the pressure in the casing exceeds the predetermined value. The second deformable member is disposed on a side opposite to the first deformable member relative to the second conductive member. The second deformable member is provided with a projection, on a second conductive member side, that has a shape projecting toward the second conductive member. The first seal member is disposed between the first conductive member and the second conductive member. The first seal member keeps an inside of the current interruption device airtight against an outside of the current interruption device. A second seal member is disposed between the casing and the first conductive member. The second seal member keeps an inside of the casing airtight against an outside of the casing. In the electrical energy storage device disclosed herein, a gas permeability between the casing and the first conductive member which is where the second seal member seals is equal to or less than a gas permeability between the first conductive member and the second conductive member which is where the first seal member seals.

In the electrical energy storage device described above, the gas permeability at a portion where the second seal member is disposed (second gas permeability) is equal to or less than a gas permeability at the portion where the first seal member is disposed (first gas permeability). Due to this, in the electrical energy storage device, gas within the casing (gas on the outside of the current interruption device) can be prevented from moving to an outside of the casing through between the casing and the first conductive member before the gas moves to the inside of the current interruption device through between the first conductive member and the second conductive member. More specifically, the second deformable member is actuated by a pressure difference between the inside and the outside of the current interruption device. Due to this, the first seal member is designed to continuously seal a clearance between the first conductive member and the second conductive member until the pressure difference between the inside and the outside of the current interruption device reaches a difference by which the second deformable member is actuated. Thus, by setting the second gas permeability to be equal to or less than the first gas permeability, it is possible to prevent a situation where the gas is discharged through between the casing and the first conductive member such that the current interruption device fails to be actuated even though an abnormality is occurring in the electrical energy storage device.

According to the art disclosed herein, the decrease in responsiveness of a current interruption device can be restrained.

DESCRIPTION OF EMBODIMENTS

Now, some of technical features of an electrical energy storage device disclosed herein are described. Note that, matters described below each independently have technical utility.

An electrical energy storage device comprises a casing, an electrode assembly, an electrode terminal, and a current interruption device. The electrode assembly may be accommodated in the casing, and may include a positive electrode and a negative electrode. The electrode terminal may be disposed across an inside and an outside of the casing. Specifically, a part of the electrode terminal may be located on the outside of the casing, and another part of the electrode terminal may be located on the inside of the casing. Further, the electrode terminals may be fixed to the casing. The electrode terminals may be configured to transfer electricity with the electrodes (positive electrodes or negative electrodes). The current interruption device may be connected to a negative terminal and the negative electrode. In this case, the current interruption device is disposed on a conductive path between the negative terminal and the negative electrodes, and configured to switch a state of the negative terminal and the negative electrodes from a conductive state to a non-conductive state when the internal pressure in the casing exceeds a predetermined value. The current interruption device may be connected to a positive terminal and the positive electrode. In this case, the current interruption device is disposed on a conductive path between the positive terminal and the positive electrode, and configured to switch a state of the positive terminal and the positive electrodes from the conductive state to the non-conductive state when the internal pressure in the casing exceeds the predetermined value.

The current interruption device may comprise a first conductive member, a second conductive member, a first deformable member, a second deformable member, and a first seal member. The first conductive member may be fixed to the casing of the electrical energy storage device. The first conductive member may be connected to the electrode terminal. Alternatively, the first conductive member may be a part of the electrode terminal. The first conductive member may include an enlarged diameter portion located in the casing, and a projecting portion projecting to the outside of the casing through a through-hole that is provided on the casing. Further, the projecting portion may be provided with a bolt portion. The first conductive member may be fixed to the casing by fastening a nut to the bolt portion provided to the projecting portion. A size of the enlarged diameter portion may be larger than that of the through-hole provided through the casing. That is, a part of the enlarged diameter portion may be opposed to the casing. An end surface on an electrode assembly side of the first conductive member may be opposed to the second conductive member. A center portion of the end surface may be provided with a recessed portion recessed to a side opposite to the second conductive member.

The second conductive member may be disposed at a position opposed to and spaced from the first conductive member. The second conductive member may be connected to the electrodes. A thickness of a center portion of the second conductive member may be smaller than a thickness of an end of the second conductive member. At the center portion of the second conductive member, there may be provided a breakable groove which firstly breaks off when the pressure in the casing exceeds the predetermined value. The breakable groove may form a circle which is continuous or intermittent at the center portion of the second conductive member. Note that, the breakable groove may only have to be a fragile portion which firstly breaks off when the pressure in the casing exceeds the predetermined value, and may be provided locally at the center portion of the second conductive member.

The first deformable member may be disposed between the first conductive member and the second conductive member. An end of the first deformable member may be connected to the first conductive member, and a center portion of the first deformable member may be connected to the second conductive member. The center portion of the first deformable member may be fixed to the second conductive member at a position surrounded by the breakable groove. The first deformable member may be brought out of conduction with the second conductive member when the pressure in the casing exceeds the predetermined value. The center portion of the first deformable member may be configured to be projecting toward the second conductive member when conduction is established between the first deformable member and the second conductive member, and may be configured to be deformed to project toward the first conductive member when the first deformable member is out of conduction with the second conductive member.

The second deformable member may be disposed on a side opposite to the first deformable member relative to the second conductive member. The second deformable member may be fixed to the second conductive member. The second deformable member may be provided between the second conductive member and the electrode assembly. The second deformable member may separate the inside and outside of the current interruption device. That is, the second deformable member may constitute an outer surface of the current interruption device such that the pressure in the casing may be directly applied to the second deformable member. At a center portion on a second conductive member side of the second deformable member, there may be provided a projection that has a shape projecting toward the second conductive member. The projection may be opposed to a portion surrounded by the breakable groove of the second conductive member under a state in which the projection is spaced from the second conductive member. The projection may be an insulator.

The center portion of the second deformable member may be configured to be projecting in a direction away from the second conductive member when the pressure in the casing is equal to or less than the predetermined value, and may be configured to move toward the second conductive member when the pressure in the casing exceeds the predetermined value such that the projection comes into contact with the second conductive member. The projection may make contact with the second conductive member to break off the second conductive member such that the first deformable member and the second conductive member are brought out of contact with each other. The second deformable member may have the same structure as that of the first deformable member. The second deformable member may be made of metal, or may be made of something other than metal.

The first seal member may be disposed between the first conductive member and the second conductive member. The first seal member may have an insulation property. A material of the first seal member may be, for example, resin or rubber. The first seal member may be configured to separate a space surrounded by the first seal member, the first conductive member, and the second conductive member (space on an inside of the current interruption device) from a space on an outside of the current interruption device. That is, the first seal member may keep the space on the inside of the current interruption device airtight against the outside of the current interruption device. The first seal member may be sealing, on an outside of the above-mentioned deformable member, the first conductive member and the second conductive member.

On the inside of the casing, the second seal member may be disposed between an inner wall of the casing and the first conductive member. The second seal member may be disposed between the inner wall of the casing and the above-mentioned enlarged diameter portion. The second seal member may keep the inside of the casing airtight against the outside of the casing. The second seal member may have an insulation property. A material of the second seal member may be, for example, rubber. The material of the second seal member may be the same as or different from the material of the first seal member.

An air-tightness of the casing may be equal to or higher than an air-tightness of the current interruption device. That is, a gas permeability between the casing and the first conductive member which is where the second seal member seals (hereinafter, referred to as "second gas permeability") may be equal to or less than a gas permeability between the first conductive member and the second conductive member Which is where the first seal member seals (hereinafter, referred to as "first gas permeability"). In this case, a material that is less in gas permeability than the material of the first seal member may be used as a material of the second seal member. Alternatively, the materials of the first seal member and the second seal member may be the same, and the second gas permeability may be structurally adjusted to be equal to or less than the first gas permeability.

When the materials of the first seal member and the second seal member are the same, a width of the second seal member (distance between a surface located on an inner side of the casing and a surface located on an outer side of the casing) may be equal to or larger than a width of the first seal member (distance between a surface located on an inner side of the current interruption device and a surface located on an outer side of the current interruption device). Alternatively, an area in which the second seal member is in contact with the casing and the first conductive member may be set equal to or larger than an area in which the first seal member is in contact with the first conductive member and the second conductive member. A circumferential length of the second seal member may be set smaller than a circumferential length of the first seal member. Note that, the air-tightness of the casing may be higher than the air-tightness of the current interruption device.

Examples of the electrical energy storage device disclosed herein may include a secondary battery and a capacitor. Examples of the electrode assembly of the secondary battery include a stack-type electrode assembly in which a plurality of cells each including a pair of electrodes (a negative electrode and a positive electrode) opposing each other via a separator are stacked, and a wound-type electrode assembly in which a cell sheet including a pair of electrodes opposed to each other via a separator is formed into a spiral shape. Further, the electrical energy storage device disclosed herein can be mounted, for example, to a vehicle, and supply electric power to a motor. Hereinbelow, a structure of the electrical energy storage device will be described. Note that, an electrical energy storage device comprising a current interruption device connected to a negative terminal and a negative electrode will be described. The art disclosed herein is applicable also to an electrical energy storage device comprising a current interruption device connected to a positive terminal and a positive electrode.

(First Embodiment)

Figure 1:
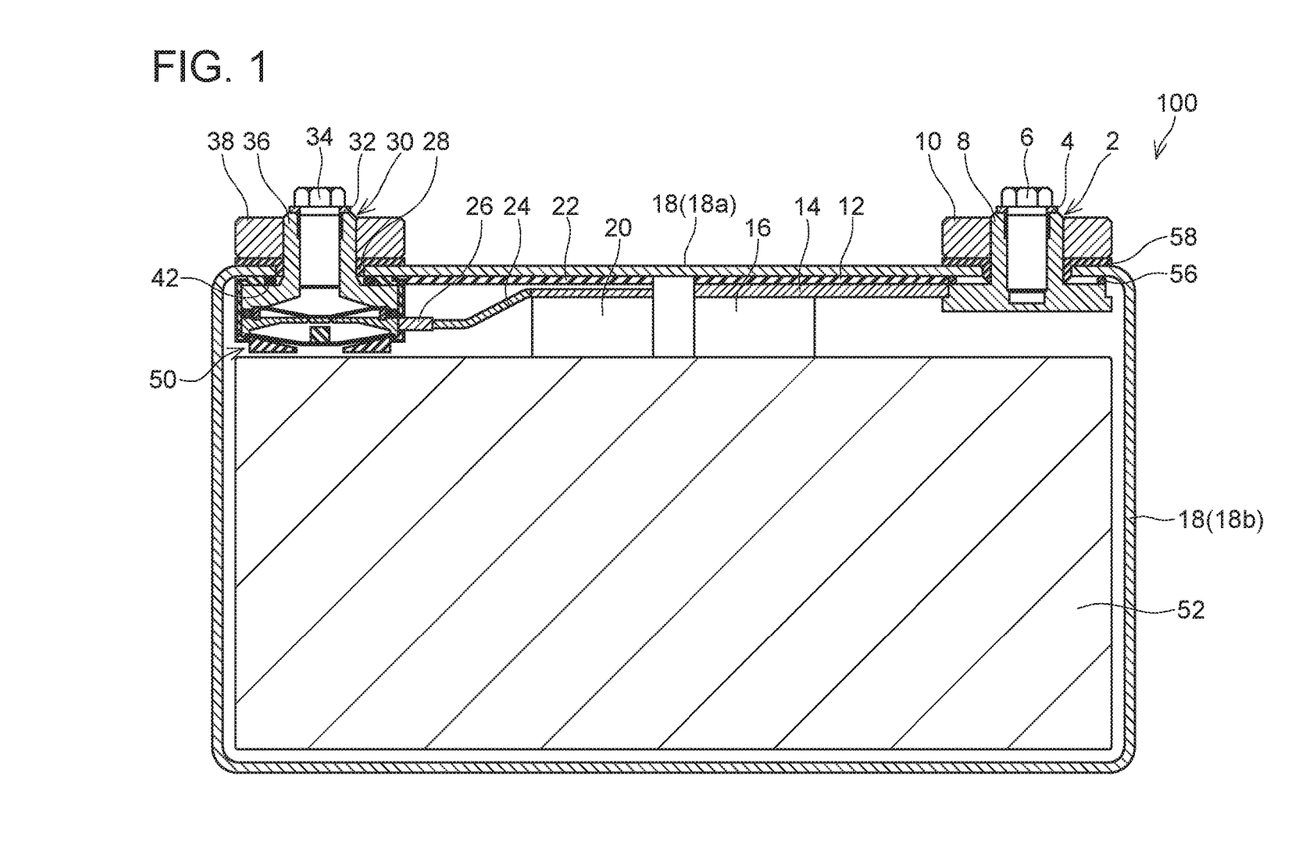
FIG. 1 is a sectional view of an electrical energy storage device according to a first embodiment.

With reference to FIG. 1, a structure of an electrical energy storage device 100 will be described. The electrical energy storage device 100 comprises a casing 18, an electrode assembly 52, a positive terminal 2, a negative terminal 30, and a current interruption device 50. The casing 18 is made of metal, and has a substantially cuboid shape. The casing 18 includes a lid 18a and a body 18b. The electrode assembly 52 and the current interruption device 50 are accommodated in the casing 18. The electrode assembly 52 includes a positive electrode and a negative electrode (not shown). A positive tab 16 is fixed to the positive electrode, and a negative tab 20 is fixed to the negative electrode. An inside of the casing 18 is filled with an electrolyte solution.

The positive terminal 2 and the negative terminal 30 extend across the inside and an outside of the casing 18. The positive terminal 2 and the negative terminal 30 are disposed on one of directions of the casing 18. That is, both the positive terminal 2 and the negative terminal 30 are disposed along the same direction (side on which the lid portion 18a is provided) relative to the electrode assembly 52. The positive terminal 2 includes a bolt portion 8. Note that, the bolt portion 8 refers to a threaded portion of the positive terminal 2 which is threaded for fastening a nut 10. The positive terminal 2 is fixed to the casing 18 by fastening the nut 10 to the bolt portion 8. The positive terminal 2 has one end located on the outside of the casing 18, and another end located on the inside of the casing 18. Similarly, the negative terminal 30 includes a bolt portion 36. The bolt portion 36 refers to a threaded portion of the negative terminal 30 which is threaded for fastening a nut 38. The negative terminal 30 is fixed to the casing 18 by fastening the nut 38 to the bolt portion 36. The negative terminal 30 has one end located on the outside of the casing 18, and another end located on the inside of the casing 18.

A positive lead 14 is connected to the positive terminal 2. The positive lead 14 is connected to the positive tabs 16. The positive terminal 2 is electrically connected to the positive tab 16 via the positive lead 14. That is, the positive terminal 2 is electrically connected to the positive electrode of the electrode assembly 52. The positive lead 14 is insulated from the casing 18 by an insulating sheet 12. The positive terminal 2 and the nut 10 are insulated from the casing 18 by an insulating member 58. In the casing 18, a seal member 56 having an insulation property is disposed between the positive terminal 2 and the casing 18. The seal member 56 is made of resin. A gap between the positive terminal 2 and the casing 18 is sealed by the seal member 56. Further, a bus bar 4 is fixed to the positive terminal 2 with a bus-bar bolt 6.

The current interruption device 50 is connected to the negative terminal 30. The current interruption device 50 is described in detail below. The current interruption device 50 is connected to a negative lead 24 via a connector 26 made of metal. The negative terminal 30 is electrically connected to the negative tab 20 via the negative lead 24. That is, the negative terminal 30 is electrically connected to the negative electrode of the electrode assembly 52. The negative lead 24 is insulated from the casing 18 by a sheet 22 having an insulation property. The negative terminal 30 and the nut 38 are insulated from the casing 18 by an insulating member 28. in the casing 18, an insulating second seal member 42 is disposed between the negative terminal 30 and the casing 18. A material of the second seal member 42 is resin. The second seal member 42 is an O-ring having an insulation property. The second seal member 42 is the same as the seal member 56. The seal members 56 and 42 keep the inside of the casing 18 is kept airtight against the outside of the casing 18. Note that, a bus bar 32 is fixed to the negative terminal 30 with a bus-bar bolt 34.

In the electrical, energy storage device 100, when pressure in the casing 18 is equal to or less than a predetermined value, the negative terminal 30 and the negative tab 20 are electrically connected to each other via the current interruption device 50. That is, a conduction is established between the negative terminal 30 and the negative electrode. When the pressure in the casing exceeds the predetermined value, the current interruption device 50 interrupts the conduction between the negative terminal 30 and the negative tab 20 such that current is prevented from flowing to the electrical energy storage device 100.

Figure 2:
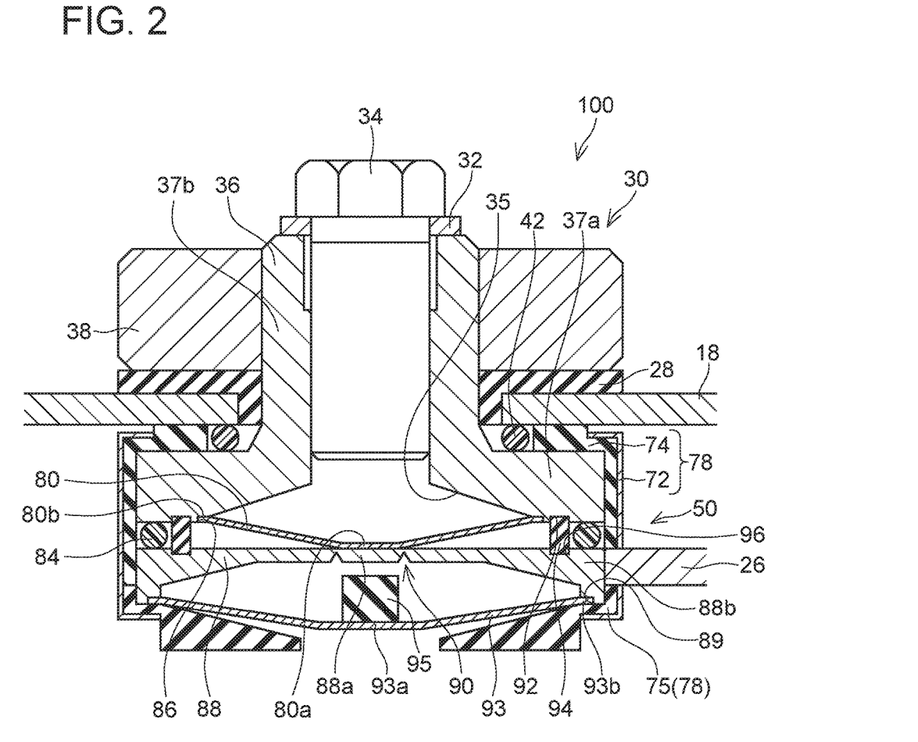
FIG. 2 is an enlarged sectional view of a current interruption device used in the electrical energy storage device according to the first embodiment.

With reference to FIG. 2, the current interruption device 50 is described. The current interruption device 50 comprises the negative terminal 30, a breakable plate 88 made of metal, a first deformable member 80 made of metal, and a second deformable member 93 made of metal. The negative terminal 30 includes an enlarged diameter portion 37a and a projecting portion 37b. The enlarged diameter portion 37a is located within the casing 18, and the projecting portion 37b is projecting to the outside of the casing 18 through a through-hole that is provided on the casing 18. The projecting portion 37b refers to a projecting portion of the negative terminal 30 which is projecting to an upper side relative to the casing 18. The projecting portion 37b is provided with the bolt portion 36. The bolt portion 36 refers to a portion of the projecting portion 37b a surface of which is threaded for fastening the nut 38. The negative terminal 30 is an example of a first conductive member.

A part of the enlarged diameter portion 37a is opposed to the casing 18. The second seal member 42 is disposed between the enlarged diameter portion 37a and the casing 18. A groove 92 and a recess 86 are provided on the enlarged diameter portion 37a on a breakable plate 88 side. The recess 86 is provided on an inner side relative to the groove 92. An end surface 35 on the breakable plate 88 side of the enlarged diameter portion 37a is opposed to the breakable plate 88, and recessed toward a center of the end surface 35. Specifically, the end surface 35 is inclined to become away from the breakable plate 88 in a direction from an end of the end surface 35 toward the center of the end surface 35. Note that, the "groove" refers to a shape having a bottom surface surrounded by two side walls. Further, the "recess" refers to a shape merely smaller in height than its surroundings. A shape having a step is also encompassed by the "recess."

The breakable plate 88 is disposed at a position spared from and opposed to the enlarged diameter portion 37a. The breakable plate 88 is an example of a second conductive member. Between the electrode assembly 52 (refer also to FIG. 1) and the casing 18, the second deformable member 93, the breakable plate 88, the first deformable member 80, and the enlarged diameter portion 37a are disposed in this order above the electrode assembly 52. A groove 96 is provided in an end surface of the breakable plate 88 on an enlarged diameter portion 37a side. The groove 96 is provided at a position opposed to the groove 92. The connector 26 is fixed to the breakable plate 88. Conduction is established between the breakable plate 88 and the negative tab 20 via the connector 26 and the negative lead 24 (refer also to FIG. 1). A thickness of a center portion 88a of the breakable plate 88 is smaller than a thickness of an end 88b. Further, on a side opposite to the enlarged diameter portion 37a, a breakable groove 90 is provided at the center portion 88a. The breakable groove 90 forms a continuous circle at the center portion 88a. A recess 89 is provided on a side of the breakable plate 88 which is opposite to the enlarged diameter portion 37a. The recess 89 is provided at the end 88b of the breakable plate 88.

A first seal member 84 is disposed between the enlarged diameter portion 37a and the breakable plate 88. The first seal member 84 is an O-ring having an insulation property. A material of the first seal member 84 is rubber. The first seal member 84 insulates the enlarged diameter portion 37a and the breakable plate 88 from each other, and keeps an inside of the current interruption device 50 airtight. That is, the first seal member 84 seals the enlarged diameter portion 37a and the breakable plate 88 so as to shield a space on the inside of the current interruption device 50 from a space on an outside of the current interruption device 50 (space in the casing 18). EPDM (ethylene propylene rubber) for example may be used as the material of the first seal member 84. A diameter of the first seal member 84 is larger than a diameter of the second seal member 42. That is, a circumferential length of the first seal member 84 is larger than a circumferential length of the second seal member 42. Note that, in the electrical energy storage device 100, a gas permeability between the easing 18 and the enlarged diameter portion 37a (second gas permeability) is equal to or less than a gas permeability between the enlarged diameter portion 37a and the breakable plate 88 (first gas permeability). More specifically, a gas permeability of the second seal member 42 is adjusted to be equal to or less than a gas permeability of the first seal member 84. That is, the phrase "kept airtight" herein refers to a state in which a predetermined gas permeability or less is maintained.

An insulating member 94 is disposed between the enlarged diameter portion 37a (negative terminal 30) and the breakable plate 88. The insulating member 94 is disposed on an inner side relative to the first seal member 84. The insulating member 94 has a ring shape. The insulating member 94 maintains a clearance between the enlarged diameter portion 37a and the breakable plate 88. The insulating member 94 prevents the enlarged diameter portion 37a and the breakable plate 88 from making contact with each other, thereby preventing direct conduction between them. Both ends of the insulating member 94 are located within the grooves 92 and 96. Due to this, the insulating member 94 is restricted from moving toward the first deformable member 80 and the first seal member 84. Further, since the insulating member 94 is restricted from moving, even when the first seal member 84 attempts to move to a first deformable member 80 side, the first seal member 84 comes into contact with the insulating member 94, due to which the first seal member 84 does not move any further inward.

The first deformable member 80 is disposed between the enlarged diameter portion 37a and the breakable plate 88. The first deformable member 80 is a metal diaphragm. An end 80b of the first deformable member 80 is fixed to the enlarged diameter portion 37a. More specifically, under a state in which an outer circumferential rim of the first deformable member 80 is in abutment against a side wall of the recess 86 of the enlarged diameter portion 37a, the end 80b of the first deformable member 80 is welded to the enlarged diameter portion 37a. A center portion 80a of the first deformable member 80 is projecting away from the enlarged diameter portion 37a. In other words, the first deformable member 80 becomes closer to the breakable Plate 88 in a direction from the end 80b toward the center portion 80a. The center portion 80a of the first deformable member 80 is fixed to the breakable plate 88 on an inner side relative to the breakable groove 90. More specifically, the center portion 80a is welded to the breakable plate 88 within a range surrounded by the breakable groove 90.

The second deformable member 93 is disposed on a side opposite to the first deformable member 80 relative to the breakable plate 88. That is, the breakable plate 88 is disposed between the first deformable member 80 and the second deformable member 93. The second deformable member 93 is a metal diaphragm. An end 93b of the second deformable member 93 is fixed to the breakable plate 88. More specifically, the end 93b of the second deformable member 93 is welded to the breakable plate 88 under a state in which an outer peripheral rim of the second deformable member 93 is in abutment against a side wall of a recess 89 of the breakable plate 88.

A projection 95 having an insulation property is provided on the breakable plate 88 side of the second deformable member 93. The projection 95 is disposed at a center portion 93a of the second deformable member 93, and has a shape projecting toward the breakable plate 88. The projection 95 is opposed to the center portion 88a of the breakable plate 88. More specifically, in a planar view of the current interruption device 50 (as viewed in a direction along which the projecting portion 37b extends, that is, in an axial direction of the negative terminal 30), the projection 95 is located within the range surrounded by the breakable groove 90. The second deformable member 93 is projecting to become away from the breakable plate 88 in a direction from the end 93b toward the center portion 93a.

A support member 78 supports the enlarged diameter portion 37a of the negative terminal 30, and the breakable plate 88. The support member 78 includes an outer portion 72 made of metal, a first inner portion 74 having an insulation property, and a second inner portion 75 having an insulation property. The first inner portion 74 is disposed on an inner side relative to the outer portion 72, and above the second inner portion 75 (on casing 18 side). The second inner portion 75 is disposed on the inner side relative to the outer portion 72, and below the first inner portion 74 (on electrode assembly 52 side). The enlarged diameter portion 37a and the breakable plate 88 are positioned by the outer portion 72. Specifically, after the first inner portion 74 and the second inner portion 75 are disposed at predetermined positions the outer portion 72 is crimped such that the breakable plate 88 is fixed to the enlarged diameter portion 37a. Note that, the inner portions 74 and 75 insulate the enlarged diameter portion 37a and the breakable plate 88 from each other. By using the outer portion 72 that is made of metal, an air-tightness of the space within the current interruption device 50 can be further increased.

When the internal pressure in the casing 18 is equal to or less than the predetermined value, the conduction between the negative terminal 30 and the negative electrode is established via the first deformable member 80, the breakable plate 88, the connector 26, the negative lead 24, and the negative tabs 20. When the pressure in the casing 18 is equal to or less than the predetermined value, a clearance is present between a projection 95 and the breakable plate 88.

For example, when the electrical energy storage device 100 is overcharged, the internal pressure in the casing 18 increases and exceeds the predetermined value. When the pressure in the casing 18 exceeds the predetermined value, a pressure difference is generated between the inside and the outside of the current interruption device 50. As a result, pressure in the easing 18 (on outside of the current interruption device 50) is applied to the second deformable member 93, and the second deformable member 93 is deformed toward the breakable plate 88. That is, the center portion 93a is moved toward the center portion 88a of the breakable plate 88. In other words, the second deformable member 93 is inverted with the end 93b being a support, With this, the projection 95 is brought into contact with the breakable plate 88, and the breakable plate 88 is broken off firstly from the breakable groove 90. The first deformable member 80 and the breakable plate 88 are separated from each other, and hence the breakable plate 88 and the first deformable member 80 are brought out of conduction with each other. Since the negative terminal 30 and the negative electrodes are brought out of conduction with each other, current can be prevented from flowing between the positive terminal 2 and the negative terminal 30 (refer also to FIG. 1) even when the electrical energy storage device 100 is overcharged.

Further, the breaking-off of the breakable plate 88 causes the center portion 80a of the first deformable member 80 to move from the breakable plate 88 side toward the enlarged diameter portion 37a side. In other words, the first deformable member 80 is inverted. Note that, since as described above, the end surface 35 of the enlarged diameter portion 37a is recessed, the inversion of the first deformable member 80 is not hindered by the enlarged diameter portion 37a (negative terminal 30). After the breaking off of the breakable plate 88, the conduction between the first deformable member 80 and the breakable plate 88 can be prevented from being reestablished, That is, after the current interruption device 50 is actuated by the increase in pressure in the casing 18, current can be prevented from reflowing between the positive terminal 2 and the negative terminal 30.

Further, when the second deformable member 93 is inverted, a part of the projection 95 comes to a position above the breakable plate 88. In other words, the projection 95 penetrates the center portion of the breakable plate 88. The projection 95 restricts the first deformable member 80 from moving downward (breakable plate 88 side). With this, the conduction between the first deformable member 80 and the breakable plate 88 can be more reliably prevented from being reestablished.

Now, an advantage of the electrical energy storage device 100 is described. As described above, when the internal pressure in the casing 18 increases and exceeds the predetermined value, the second deformable member 93 is deformed to bring the first deformable member 80 and the breakable plate 88 out of conduction with each other. The second deformable member 93 is deformed by the pressure difference between the inside and the outside of the current interruption device 50. The pressure difference between the inside and the outside of the current interruption device 50 is generated by seam, the clearance between the enlarged diameter portion 37a and the breakable plate 88 with the first seal member 84. In the electrical energy storage device 100, the gas permeability between the casing 18 and the enlarged diameter portion 37a (second gas permeability) is equal to or less than the gas permeability between the enlarged diameter portion 37a and the breakable plate 88 (first gas permeability). The first gas permeability is adjusted such that, when the internal pressure in the casing 18 increases, gas on the outside of the current interruption device 50 does not move to the inside of the current interruption device 50 until the second deformable member 93 is actuated. Thus, by setting the second gas permeability equal to or less than the first gas permeability, the gas on the inside of the casing 18 can be prevented from moving to the outside of the casing 18 before the second deformable member 93 is actuated. With this, in case where an abnormality occurs in the electrical energy storage device 100, the current interruption device 50 can be reliably actuated.

Next, another advantage of the electrical energy storage device 100 is described. As described above, the circumferential length of the first seal member 84 is longer than the circumferential length of the second seal member 42. Thus, an area in which the second seal member 42 is exposed to the gas on the inside of the casing 18 (outside of the current interruption device 50) is smaller than an area in which the first seal member 84 is exposed to the same. The gas in the casing 18 can be more reliably restrained from leaking to the outside of the casing 18.

In the electrical energy storage device 100, also under a normal state(state in which an abnormality is not occurring), gas may be generated due, for example, to decomposition of the electrolyte solution. However, the material of the first seal member 84 is rubber. Thus, the gas generated in the casing 18 is allowed to gradually pass through the first seal member 84 such that the internal pressure in the casing 18 can be restrained from increasing. Notably, the internal pressure in the casing 18 rapidly increases when an abnormality occurs in the electrical energy storage device 100. Therefore, although the first seal member 84 allows the gas generated under the normal state to gradually pass through the inside of the first seal member 84, the first seal member 84 does not allow gas generated in the casing 18 upon an abnormality occurring in the electrical energy storage device 100 to pass through the inside of the first seal member 84 and accordingly the pressure difference between the inside and the outside of the current interruption device 50 will not be decreased before the internal pressure in the casing 18 reaches the predetermined value.

Both ends of the insulating member 94 are located within the grooves 92 and 96, restricting the insulating member 94 from moving toward the first deformable member 80 and the first seal member 84. The insulating member 94 can be prevented from making contact with the first deformable member 80, and accordingly narrowing of a movable range of the first deformable member 80, or deformation of the first deformable member 80 can be prevented. Similarly, the insulating member 94 can be prevented from making contact with the first seal member 84, and also narrowing of an existing space for the first seal member 84 can be prevented. If the existing space for the first seal member 84 is narrowed, a filling rate of the first seal member 84 is increased, as a result of which there may occur problems such as breakage of the first seal member 84.

Still further, in the configuration described above in this embodiment, the current interruption device is connected to the negative lead via the connector. However, the connector and the negative lead may be provided as a single component. That is, the current interruption device may be connected directly to a member (negative lead) that is connected to the negative tab. Further, when the current interruption device is disposed between the positive terminal and the positive electrode, the current interruption device may be connected directly to a member (positive lead) that is connected to the positive tab.

The structure of the electrical energy storage device described above is not particularly limited as long as the seal member made of rubber is provided between the electrode terminal (first conductive member) and the casing such that the gas on the inside of the casing is gradually moved to the outside of the casing. Thus, various materials can be used as those of the components of the current interruption device, and those of the components of the electrical energy storage device. Hereinbelow, as to a lithium-ion secondary battery, which is an example of the electrical energy storage device, materials of the components of the electrical energy storage device are exemplified.

The electrode assembly will be described. The electrode assembly includes a positive electrode, a negative electrode, and a separator interposed at a position between the positive electrode and the negative electrode. The positive electrode includes a positive-electrode metal foil, and a positive-electrode active material layer arranged on the positive-electrode metal foil. The positive tab corresponds to a part of the positive-electrode metal foil to which the positive-electrode active material layer is not applied. The negative electrode includes a negative-electrode metal foil, and a negative-electrode active material layer arranged on the negative-electrode metal foil. The negative tab corresponds to a part of the negative-electrode metal foil to which the negative-electrode active material layer is not applied. Note that, materials contained in the active material layer (active material, binder, conductive additive, and the like) are not particularly limited, and materials of electrodes of, for example, publicly-known electrical energy storage devices may be used.

As the positive-electrode metal foil, aluminum (Al), nickel (Ni), titanium (Ti), stainless steel, or composite materials thereof may be used. In particular, it is preferred to use aluminum or composite materials containing aluminum. Further, as materials of the positive lead, the same materials as those usable for the positive-electrode metal foil may be used.

The positive-electrode active material may only have to be a material which lithium ions can be adsorbed into and desorbed from, and for example, $Li_2MnO_3$, $Li(NiCoMn)_{0.33}O_2$, $Li(NiMn)_{0.5}O_2$, $LiMn_2O_4$, $LiMnO_2$, $LiNiO_2$, $LiCoO_2$, $LiNi_{0.8}Co_{0.15}Al_{0.05}O_2$, $Li_2MnO_2$, and $LiMn_2O_4$ may be used. Further, as the positive-electrode active material, for example, alkali metals such as lithium and sodium, or sulfur may be used. Those materials may be used alone or in combination with each other. The positive-electrode active material is applied as appropriate to the positive-electrode metal foil together with, for example, a conductive agent and a binder.

As the negative-electrode metal foil, for example, aluminum (Al), nickel (Ni), copper (Cu), or composite materials thereof may be used. In particular, it is preferred to use copper or composite materials containing copper. Further, as materials of the negative lead, the same materials as those usable for the negative-electrode metal foil may be used.

As the negative-electrode active material, materials that lithium ions can be absorbed into and desorbed from are used. Specifically, alkali metals such as lithium (Li) and sodium (Na), transition metal oxides containing alkali metals, carbon materials such as natural graphite, mesocarbon microbeads, highly-oriented graphite, hard carbon, and soft carbon, and elemental silicon, silicon-containing alloys, or silicon-containing oxides may be used. Note that, in order to increase a battery capacity, it is particularly preferred that the negative-electrode active material not contain lithium (Li). The negative-electrode active material is applied as appropriate to the negative-electrode metal foil together with, for example, a conductive agent and a binder.

As the separator, porous bodies having an insulation property is used. Specifically, porous films made of polyolefin-based resins such as polyethylene (PE) and polypropylene (PP), or a woven fabric sheet or a nonwoven fabric sheet made, for example, of polypropylene, polyethylene terephthalate (PET), or methyl cellulose may be used.

It is preferred that the electrolyte solution be a non-aqueous electrolyte solution obtained through dissolution of supporting salt (electrolyte) into a non-aqueous solvent. As the non-aqueous solvent, solvents containing chain esters such as ethylene carbonate (EC), propylene carbonate (PC), dimethyl carbonate (DMC), diethyl carbonate (DEC), and ethyl methyl carbonate (EMC), solvents such as ethyl acetate and methyl propionate, or mixtures thereof may be used. Further, as the supporting salt (electrolyte), for example, $LiPF_6$, $LiBF_4$, and $LiAsF_6$ may be used.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. An electrical energy storage device comprising a current interruption device configured to interrupt conduction between an electrode and an electrode terminal when pressure in a casing exceeds a predetermined value, wherein
the electrode is accommodated in the casing, and
the electrode terminal is fixed to the casing and configured to transfer electricity with the electrode,
wherein
the current interruption device comprises:
a first conductive member fixed to the casing and connected to the electrode terminal;
a second conductive member disposed at a position spaced from and opposed to the first conductive member, and connected to the electrode;
a first deformable member disposed between the first conductive member and the second conductive member, an end of the first deformable member being connected to the first conductive member, a center portion of the first deformable member being connected to the second conductive member, and the first deformable member being configured to be brought out of conduction with the second conductive member when the pressure in the casing exceeds the predetermined value;
a second deformable member disposed on a side opposite to the first deformable member relative to the second conductive member, and being provided with a projection, on a second conductive member side, that has a shape projecting toward the second conductive member; and
a first seal member disposed between the first conductive member and the second conductive member and keeping an inside of the current interruption device airtight against an outside of the current interruption device,
wherein
a second seal member disposed between the casing and the first conductive member and keeping an inside of the casing airtight against an outside of the casing, and
a second gas permeability between the casing and the first conductive member which is where the second seal member seals is less than a first gas permeability between the first conductive member and the second conductive member which is where the first seal member seals.

2. The electrical energy storage device according to claim 1, wherein
a material of the first seal member is rubber, and a material of the second seal member is resin.

3. The electrical energy storage device according to claim 2, wherein
a circumferential length of the first seal member is longer than a circumferential length of the second seal member.

4. The electrical energy storage device according to claim 3, wherein the electrical energy storage device is a secondary battery.

5. The electrical energy storage device according to claim 1, wherein
a circumferential length of the first seal member is longer than a circumferential length of the second seal member.

6. The electrical energy storage device according to claim 1, wherein the electrical energy storage device is a secondary battery.

7. The electrical energy storage device according to claim 1, wherein the end of the first deformable member is welded to the first conductive member and the first seal member does not contact the first deformable member.

8. The electrical energy storage device according to claim 1, further comprising an insulating member disposed between the first conductive member and the second conductive member so as to maintain a clearance between the first conductive member and the second conductive member.

* * * * *